United States Patent
Kojima

(10) Patent No.: US 8,104,556 B2
(45) Date of Patent: Jan. 31, 2012

(54) DRIVE-CONTROL APPARATUS FOR ELECTRIC DRIVE VEHICLE

(75) Inventor: Shigeru Kojima, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 532 days.

(21) Appl. No.: 12/439,349

(22) PCT Filed: Dec. 27, 2006

(86) PCT No.: PCT/JP2006/326080
§ 371 (c)(1),
(2), (4) Date: Feb. 27, 2009

(87) PCT Pub. No.: WO2008/081509
PCT Pub. Date: Jul. 10, 2008

(65) Prior Publication Data
US 2009/0260904 A1     Oct. 22, 2009

(51) Int. Cl.
*B60W 10/00* (2006.01)
(52) U.S. Cl. ............ 180/65.31; 180/165; 180/65.1; 180/65.285; 902/906
(58) Field of Classification Search ............ 180/65.1, 180/165, 65.27–65.285; 902/906
See application file for complete search history.

(56) References Cited

U.S. PATENT DOCUMENTS
6,166,512 A   12/2000   Kojima
6,173,574 B1 *   1/2001   Obayashi et al. ............ 60/710
(Continued)

FOREIGN PATENT DOCUMENTS
JP   52-105048   9/1977
(Continued)

OTHER PUBLICATIONS
International Search Report for PCT/JP2006/326080, completed Mar. 30, 2007.

*Primary Examiner* — J. Allen Shriver, II
*Assistant Examiner* — James Triggs
(74) *Attorney, Agent, or Firm* — Buchanan Ingersoll & Rooney PC

(57) ABSTRACT

A drive-control apparatus for an electric-drive vehicle drives and controls a vehicle driven by electric power generated from mechanical power produced by an internal combustion engine (1). In order to cool down an electric power converter (3) without increasing the engine-rotation speed during deceleration of the locomotive using electric braking; the drive-control apparatus includes a braking resistor (10) for dissipating electric power that is generated by a main rotating machine (4) and supplied through the electric power converter (3); a fan motor (7), whose pole number is changeable, supplied with alternating electric power that is generated by an auxiliary generator (6) and has a frequency proportional to a rotation speed of the internal combustion engine (1); a fan (8) for making an air flow in order to cool down the electric power converter (3), being driven by the fan motor (7); a pole-number-changing switch (9) for changing the pole number of the fan motor (7); and a controlling unit for controlling the internal combustion engine (1), the electric power converter (3), the braking resistor (10), and the pole-number-changing switch (9).

4 Claims, 3 Drawing Sheets

U.S. PATENT DOCUMENTS

| | | | |
|---|---|---|---|
| 6,470,983 B1 * | 10/2002 | Amano et al. | 180/65.235 |
| 6,664,751 B1 * | 12/2003 | Gabriel et al. | 318/599 |
| 6,933,734 B2 * | 8/2005 | Kojima | 324/713 |
| 7,690,456 B2 * | 4/2010 | Deng et al. | 180/65.265 |
| 7,812,555 B2 * | 10/2010 | Adra | 318/376 |
| 7,832,510 B2 * | 11/2010 | Hoshiba et al. | 180/65.265 |
| 8,013,548 B2 * | 9/2011 | King et al. | 318/139 |
| 2003/0118891 A1 * | 6/2003 | Saito et al. | 429/62 |
| 2009/0260904 A1 * | 10/2009 | Kojima | 180/65.275 |

FOREIGN PATENT DOCUMENTS

| | | |
|---|---|---|
| JP | 57-95247 | 6/1982 |
| JP | 62-207105 A | 9/1987 |
| JP | 2000-023305 A | 1/2000 |
| JP | 2000-203420 A | 7/2000 |
| JP | 2005-304151 A | 10/2005 |

* cited by examiner

DRIVE-CONTROL APPARATUS FOR ELECTRIC DRIVE VEHICLE

TECHNICAL FIELD

The present invention relates to drive-control apparatus that drive and control a vehicle which is driven by electric power generated from mechanical power produced by an internal combustion engine.

BACKGROUND ART

In a conventional diesel-electric locomotive, a main generator directly coupled to a diesel engine generates electric power and supplies the electric power to a traction motor via an electric power converter. The diesel engine and the main generator generate heat; therefore, they are cooled down by an engine fan mechanically direct-coupled to the engine. Furthermore, the traction motor and the electric power converter also generate heat; therefore, they are cooled down by either the engine fan or an electric fan mechanically direct-coupled to an auxiliary generator.

The engine fan rotates at the same rotation speed as the engine; therefore, the air flow volume is approximately proportional to the engine rotation speed. In addition, an AC generator, which excels at maintenance, is generally used as the auxiliary generator, and the output frequency thereof is proportional to the engine rotation speed. An induction motor, which excels at maintenance, is generally used as the electric fan, and the rotation speed thereof is approximately proportional to the frequency of its power supply, so that the air flow volume is approximately proportional to the engine rotation speed.

When the locomotive accelerates, the traction motor is supplied with output power from the diesel engine, through the main generator and the electric power converter; therefore, the quantity of heat generated by each of those devices is proportional to output power from the diesel engine. For this reason, the rotation speed of the diesel engine is made approximately proportional to its output power, so that the air flow volumes made by the engine fan and the electric fan are approximately proportional to the rotation speed of the diesel engine. Operating the diesel engine with its rotation speed being approximately proportional to its output power results in high fuel efficiency, thereby leading to a system configuration that gives high efficiency during accelerations.

On the other hand, when the locomotive decelerates, the traction motor and the electric power converter convert into electric power kinetic energy of the locomotive and its cars, so that a braking resistor dissipates this electric power. During this period, the engine produces little mechanical power but the traction motor and the electric power converter generate heat; therefore, it is necessary to cool them down by the engine fan or the electric fan. Each of the fans rotates approximately proportionally to the engine rotation speed and the air flow volume thereby is proportional to its rotation speed; therefore, in order to adequately cool them down, it is necessary to rotate the engine at a higher speed.

When the diesel-electric locomotive runs into a tunnel and such, efficiency of cooling thereof is worsened; therefore, the speed of the train has been controlled in such a way that the quantity of the heat generated is within a range of its cooling capability.

Patent Document 1: Japanese Patent Laid-Open No.2000-203420

DISCLOSURE OF INVENTION

In the conventional diesel-electric locomotive employing electric braking in order to cool down, using fans, the traction motor and the electric power converter during the locomotive's deceleration, while outputting little power, the engine necessarily rotates at a high speed. This has led to low fuel efficiency during deceleration.

When the locomotive runs through sections, such as tunnels, where the cooling efficiency thereof is deteriorated, the locomotive has been run at a limited speed.

A drive-control apparatus for an electric-drive vehicle, according to the present invention, drives and controls a vehicle which is driven by electric power generated from mechanical power produced by an internal combustion engine.

The drive-control apparatus includes an internal combustion engine for producing mechanical power; a main generator and an auxiliary generator each for generating electricity, being supplied with the mechanical power that the internal combustion engine generates; a main rotating machine for producing mechanical power so as to drive the vehicle, being supplied with electric power that the main generator generates, and for generating electric power during the vehicle's deceleration; an electric power converter for performing conversion of the main-generator-generated electric power to supply the main rotating machine therewith, and for receiving electric power generated by the main rotating machine; a braking resistor for dissipating electric power that is generated by the main rotating machine and supplied through the electric power converter; a fan motor supplied with alternating electric power that is generated by the auxiliary generator and has a frequency proportional to a rotation speed of the internal combustion engine, the fan motor whose pole number is changeable; a fan for making an air flow in order to cool down the electric power converter, being driven by the fan motor; a pole-number-changing switch for changing the pole number of the fan motor; and a controlling unit for controlling the internal combustion engine, the electric power converter, the braking resistor, and the pole-number-changing switch.

Furthermore, a drive control apparatus for an electric-drive vehicle drives and controls a vehicle which is driven by electric power generated from mechanical power produced by an internal combustion engine. The drive-control apparatus includes an internal combustion engine for producing mechanical power; a main generator and an auxiliary generator each for generating electricity, being supplied with the mechanical power that the internal combustion engine generates; a main rotating machine for producing mechanical power so as to drive the vehicle, being supplied with electric power that the main generator generates; an electric power converter for performing conversion of the main-generator-generated electric power to supply the main rotating machine therewith; a fan motor supplied with alternating electric power that is generated by the auxiliary generator and has a frequency proportional to a rotation speed of the internal combustion engine, the fan motor whose pole number is changeable; a fan for making an air flow in order to cool down the electric power converter, being driven by the fan motor; a pole-number-changing switch for changing the pole number of the fan motor; a controlling unit for controlling the internal combustion engine, the electric power converter, and the pole-number-changing switch; and a position determination unit for locating the position of the vehicle and inputting the position into the controlling unit; wherein the pole-number-changing switch is controlled so as to change the pole number to a small number when the position obtained by the position determination unit indicates that the vehicle is in a tunnel.

Furthermore, a drive-control apparatus for an electric-drive vehicle drives and controls a vehicle which is driven by electric power generated from mechanical power produced by an internal combustion engine. The drive-control apparatus includes an internal combustion engine for producing mechanical power; a main generator and an auxiliary generator each for generating electricity, being supplied with the mechanical power that the internal combustion engine generates; a main rotating machine for producing mechanical power so as to drive the vehicle, being supplied with electric power that the main generator generates; an electric power converter for performing conversion of the main-generator-generated electric power to supply the main rotating machine therewith; a fan motor supplied with alternating electric power that is generated by the auxiliary generator and has a frequency proportional to a rotation speed of the internal combustion engine, the fan motor whose pole number is changeable; a fan for making an air flow in order to cool down the electric power converter, being driven by the fan motor; a pole-number-changing switch for changing the pole number of the fan motor; a controlling unit for controlling the internal combustion engine, the electric power converter, and the pole-number-changing switch; and a thermometer for measuring a temperature of the electric power converter so as to input the temperature value into the controlling unit, wherein the pole-number-changing switch is controlled so as to change the pole number to a small number when the temperature value measured by the thermometer is a predetermined value or higher.

A drive-control apparatus for an electric-drive vehicle, according to the present invention, drives and controls a vehicle which is driven by electric power generated from mechanical power produced by an internal combustion engine.

The drive-control apparatus includes an internal combustion engine for producing mechanical power; a main generator and an auxiliary generator each for generating electricity, being supplied with the mechanical power that the internal combustion engine generates; a main rotating machine for producing mechanical power so as to drive the vehicle, being supplied with electric power that the main generator generates, and for generating electric power during the vehicle's deceleration; an electric power converter for performing conversion of the main-generator-generated electric power to supply the main rotating machine therewith, and for receiving electric power generated by the main rotating machine; a braking resistor for dissipating electric power that is generated by the main rotating machine and supplied through the electric power converter; a fan motor supplied with alternating electric power that is generated by the auxiliary generator and has a frequency proportional to a rotation speed of the internal combustion engine, the fan motor whose pole number is changeable; a fan for making an air flow in order to cool down the electric power converter, being driven by the fan motor; a pole-number-changing switch for changing the pole number of the fan motor; and a controlling unit for controlling the internal combustion engine, the electric power converter, the braking resistor, and the pole-number-changing switch. Therefore, when the electric-power-driven vehicle using its electric braking decelerates, the apparatus can cool down the electric power converter and the fan motor without keeping a high rotation speed of the engine, bringing high fuel efficiency of the engine.

Furthermore, a drive control apparatus for an electric-drive vehicle drives and controls a vehicle which is driven by electric power generated from mechanical power produced by an internal combustion engine. The drive-control apparatus includes an internal combustion engine for producing mechanical power; a main generator and an auxiliary generator each for generating electricity, being supplied with the mechanical power that the internal combustion engine generates; a main rotating machine for producing mechanical power so as to drive the vehicle, being supplied with electric power that the main generator generates; an electric power converter for performing conversion of the main-generator-generated electric power to supply the main rotating machine therewith; a fan motor supplied with alternating electric power that is generated by the auxiliary generator and has a frequency proportional to a rotation speed of the internal combustion engine, the fan motor whose pole number is changeable; a fan for making an air flow in order to cool down the electric power converter, being driven by the fan motor; a pole-number-changing switch for changing the pole number of the fan motor; a controlling unit for controlling the internal combustion engine, the electric power converter, and the pole-number-changing switch; and a position determination unit for locating the position of the vehicle and inputting the position into the controlling unit; wherein the pole-number-changing switch is controlled so as to change the pole number to a small number when the position obtained by the position determination unit indicates that the vehicle is in a tunnel, which brings an effect in that the electric-drive vehicle does not need to slow down for cooling while in tunnels.

Furthermore, a drive control apparatus for an electric-drive vehicle drives and controls a vehicle which is driven by electric power generated from mechanical power produced by an internal combustion engine. The drive-control apparatus includes an internal combustion engine for producing mechanical power; a main generator and an auxiliary generator each for generating electricity, being supplied with the mechanical power that the internal combustion engine generates; a main rotating machine for producing mechanical power so as to drive the vehicle, being supplied with electric power that the main generator generates; an electric power converter for performing conversion of the main-generator-generated electric power to supply the main rotating machine therewith; a fan motor supplied with alternating electric power that is generated by the auxiliary generator and has a frequency proportional to a rotation speed of the internal combustion engine, the fan motor whose pole number is changeable; a fan for making an air flow in order to cool down the electric power converter, being driven by the fan motor; a pole-number-changing switch for changing the pole number of the fan motor; a controlling unit for controlling the internal combustion engine, the electric power converter, and the pole-number-changing switch; and a thermometer for measuring a temperature of the electric power converter so as to input the temperature value into the controlling unit, wherein the pole-number-changing switch is controlled so as to change the pole number to a small number when the temperature measured by the thermometer is a predetermined value or higher, which brings an effect in that the electric-drive vehicle does not need to slow down for cooling while in tunnels.

Figure 1:
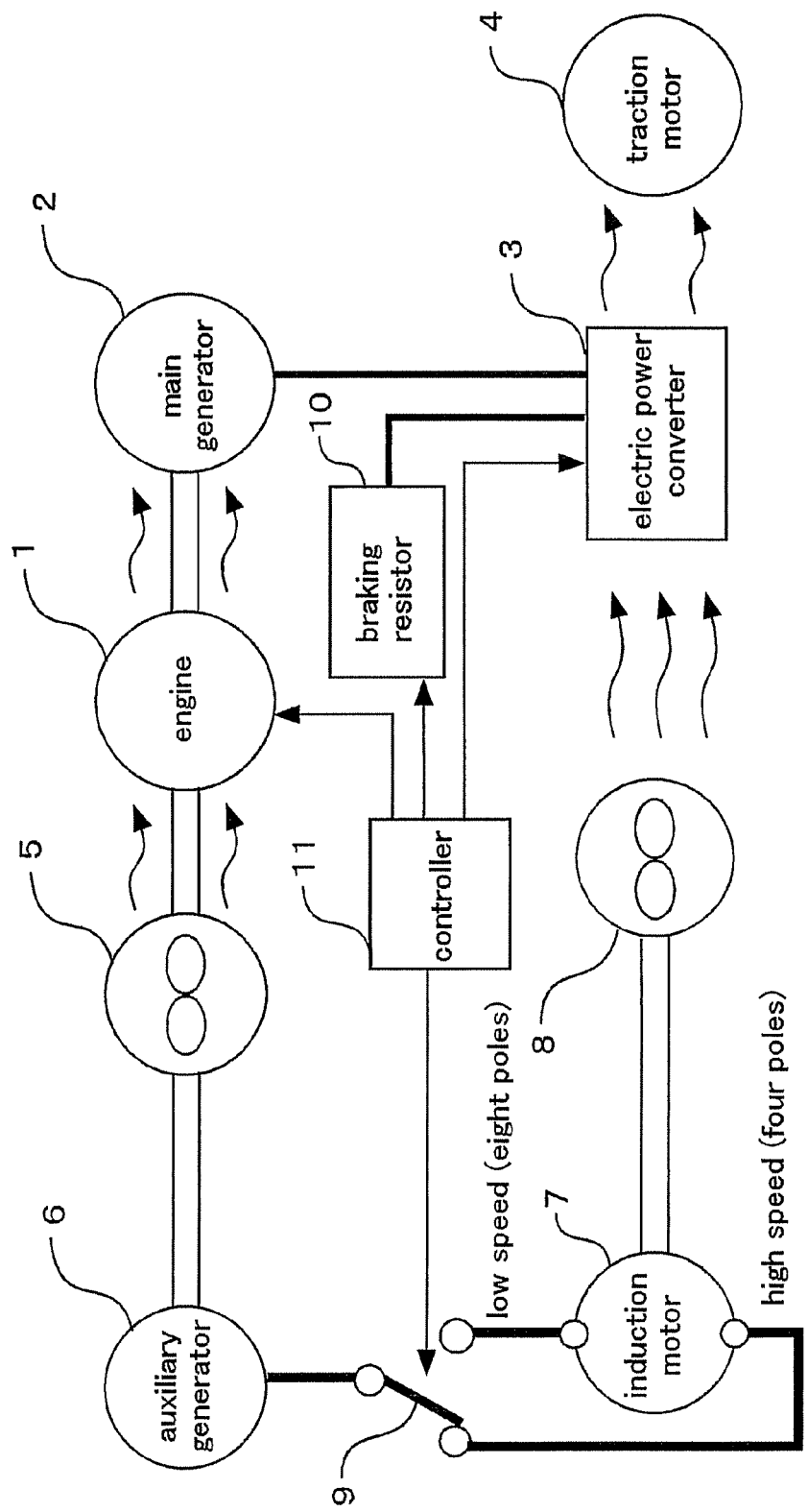
FIG. 1 is a block diagram when a drive-control apparatus, according to Embodiment 1 of the present invention, for an electric-drive vehicle is applied to a diesel-electric locomotive.

REFERENCE NUMERALS 1 diesel engine (internal combustion engine)
2 main generator
3 electric power converter
4 traction motor (main rotating machine)
5 fan
6 auxiliary generator
7 induction motor whose pole number is changeable (fan motor)
8 fan
9 pole-number-changing switch
10 braking resistor
11 11A 11B controller (controlling unit)
12 GPS device (position determination unit)
13 thermometer

BEST MODE FOR CARRYING OUT THE INVENTION

Embodiment 1

FIG. 1 is a block diagram when a drive-control apparatus, according to Embodiment 1 of the present invention, for an electric-drive vehicle is applied to a diesel-electric locomotive. In the figure, double lines represent mechanical couplings; bold lines, electrical connections; directional lines, signal flows. In addition, air flows are represented by wavy lines having arrows.

AC power is generated by a main generator 2 mechanically coupled directly to a diesel engine 1, an internal combustion engine. The generated electric power is supplied via an electric power converter 3 to a traction motor 4, a main rotating machine. Being supplied with the electric power, the traction motor 4 produces force for driving the vehicle. On the other hand, when the vehicle decelerates, the motor generates electricity to generate braking force. The electric power converter 3 receives the electric power that the traction motor 4 generates. The electric power is thus fed bidirectionally between the electric power converter 3 and the traction motor 4.

A fan 5 is mechanically coupled directly to the engine 1 in order to cool down the engine 1 and the main generator 2. An auxiliary generator 6 is also mechanically coupled directly with the engine 1 in order to generate AC power with a frequency proportional to the engine rotation speed.

The electric power generated by the auxiliary generator 6 is fed into an induction motor 7—a fan motor whose pole number is changeable, for example, between four and eight. Changing the pole number is performed by changing the primary winding connection of the induction motor 7 between the delta connection and the star connection. Changing the pole number may be performed by PAM (pole amplitude modulation) method.

A fan 8 is directly coupled to the rotation shaft of the induction motor 7, so that the electric power converter 3 and the traction motor 4 are cooled down with the air flow made by the fan 8. The air flow volume made by the fan 8 is proportional to the rotation speed of the engine 1.

Assuming that the frequency of the AC power inputted into the induction motor 7 is f (Hz), the pole number of the induction motor 7, PP, the rotation speed of the induction motor 7, N (revolutions/second), and the slip frequency thereof is ignored, an equation is obtained below.

$$N = 2 * (f/PP) \qquad (1)$$

Equation (1) shows that when the pole number PP is large for the same frequency f, the rotation speed N is small. A pole-number-changing switch 9 changes the pole number of the induction motor 7 to a low-speed state (eight poles) or a high-speed state (four poles). Here, under the same frequency of the AC power, "high-speed" and "low-speed" mean that the rotation speed of the induction motor 7 is high and that the speed is low, respectively. The pole number pair of the induction motor 7 may be two and four, six and eight and such, as long as the pole number is changed between different ones. The ratio between the pole numbers to be changed is appropriately determined in accordance with the purpose of use.

When the locomotive decelerates, a braking resistor 10 dissipates the electric power that the traction motor 4 generates from the kinetic energy of the locomotive and its cars. The braking resistor 10 is cooled down by the air flow generated while running. The drive-control apparatus is configured in a manner that the heat generated by the braking resistor 10 has little effect to the temperatures of the electric power converter 3 and the traction motor 4. The reason for using the braking resistor is to maintain the fuel efficiency, the acceleration performance and such of the locomotive while using electric braking. On the other hand, if a battery and such is used to store the electric power generated by electrically braking, the battery that has a necessary capacity for the braking is heavy, so that the total weight of the locomotive increases. If the total weight of the locomotive is increased, its fuel efficiency and the acceleration performance becomes deteriorated while running.

A controller 11—a controlling unit—controls the engine 1, the electric power converter 3, the pole-number-changing switch 9, and the braking resistor 10. Not shown in the figure, a control signal from the cab is inputted into the controller 11.

The operations will be explained. When the locomotive accelerates, the engine 1 is controlled to rotate at a predetermined rotation speed f1, so that the main generator 2 and the auxiliary generator 6 generate electricity. The electric power generated by the main generator 2 is converted by the electric power converter 3 into electric power having a predetermined frequency and voltage; the traction motor 4 is supplied with the converted electric power to produce a predetermined torque. The pole-number-changing switch 9 is in the low-speed state (eight poles), so that the induction motor 7 and the fan 8 rotate at a rotation speed N1(=f1/4), whereby all of the engine 1, the main generator 2, the electric power converter 3 and the traction motor 4 operate efficiently, and necessary cooling is performed.

When the locomotive decelerates, the engine 1 rotates at a rotation speed f2A that is determined as described later. The main generator 2 does not generate electricity and the auxiliary generator 6 generates the electric power consumed by the induction motor 7 and such. The electric power converter 3 outputs an AC voltage having such a frequency that makes the traction motor 4 generate electricity; the electric power generated by the traction motor 4 is delivered to the braking resistor 10 through the electric power converter 3, and then dissipated by the braking resistor 10. The pole-number-changing switch 9 is in the high-speed state (four poles), so that the induction motor 7 and the fan 8 rotate at a rotation speed N2(=f2A/2). At the rotation speed N2, the fan 8 can make an air flow that can sufficiently cool down the electric power converter 3 and the traction motor 4. When the pole-number-changing switch 9 is in the low-speed state (eight poles), given that an engine rotation speed that makes the induction motor 7 and the fan 8 rotate at the rotation speed N2 is expressed as a symbol f2B, a relationship between f2A and f2B is given as follows:

$$f2A=2*N2=f2B/2 \qquad (2).$$

Equation (2) means that during deceleration periods the rotation speed of the engine 1 can be halved, comparing with that in the low-speed state (eight poles), by turning the pole-number-changing switch 9 to the high-speed state (four poles).

As described above, when the locomotive using electric braking decelerates, the drive-control apparatus for electric-drive vehicles according to the present invention can cool down the electric power converter and the traction motor without keeping a high rotation speed of the engine by using the pole-number-changing switch and the induction motor whose pole number is changeable, which brings an effect that the fuel efficiency of the engine is improved. An induction motor whose pole number is changeable is a little more expensive than a conventional one; however, the apparatus requires no other expensive components, so that the fuel efficiency during deceleration periods can be enhanced at low costs.

Control operations during transition to deceleration are performed in the following order.

Step 1: Decreasing the rotation speed of the engine 1 to the predetermined rotation speed f2A.

Step 2: Controlling the electric power converter 3 in such a way that the electric power converter outputs an AC voltage to make the traction motor 4 generate electricity.

Step 3: Putting the braking resistor 10 into a state in which the braking resistor dissipates the electric power from the electric power converter 3.

Step 4: Turning the pole-number-changing switch 9 to the high-speed state (four poles).

Timing restrictions on the control operations for deceleration will be explained below. Step 3 is performed simultaneously with Step 2 or within a predetermined time difference therebetween. In a state A where Step 2 has been performed but Step 3 is not performed, the electric power generated by the traction motor 4 is not dissipated, so that it is stored in a smoothing condenser provided in the electric power converter 3. To prevent overvoltage across the smoothing condenser, the period of the state A is controlled to be within a predetermined time. In a state B where Step 2 is not performed and Step 3 has been performed, the braking resistor 10 wastes the electric power generated by the generator 2.

The state B is also undesirable; thus, Step 3 is controlled not to precede Step 2 by a period exceeding a predetermined one. In addition, the state B is less urgent than the state A; therefore, the predetermined period by which Step 3 precedes may be set longer than the predetermined period by which the Step 3 lags.

The induction motor 7 has an upper limit of the rotation speed; when the rotation speed exceeds the upper limit—which state is called as a state C—by turning, without decreasing the rotation speed of the engine 1, the pole-number-changing switch 9 to the high-speed state (four poles), Step 4 needs to be performed after Step 1. Otherwise, Step 4 may be performed before or after any step.

Control operations during transition from deceleration are performed in the following order.

Step 5: Turning the pole-number-changing switch 9 to the low-speed state (eight poles).

Step 6: Putting the braking resistor 10 into a state in which the braking resistor does not dissipate electric power.

Step 7: Controlling the electric power converter 3 in such a way that the electric power converter outputs an AC voltage to make the traction motor 4 operate as a motor.

Step 8: Increasing the rotation speed of the engine 1 to the predetermined rotation speed f1.

The timing restrictions on the control operations are similar to those during transition to deceleration. A state in which Step 6 has been performed but Step 7 is not performed is the same as the state A; A state in which Step 7 has been performed but Step 6 is not performed is the same as the state B. Step 7 is performed simultaneously with Step 8 or within a predetermined time difference therebetween. Step 5 and Step 8 are performed also in an order so as not to fall into the state C.

In this embodiment, although one controller 11 controls the engine 1, the electric power converter 3, and the braking resistor 10, its control operations may be assigned to a plurality of controllers. In that case, the controlling unit includes the plurality of controllers. The fan 8 cools down both the electric power converter 3 and the traction motor 4. However the fan may cool down only the electric converter 3. In that case, the traction motor 4 is cooled down by cooling with liquid, cooling with air flow made by its own rotation, or the like.

In the explanation above, a diesel engine is exemplified as an internal combustion engine; however, other types of internal combustion engines such as gasoline engines may be used. Having been explained the drive-control apparatus used for a locomotive, the drive-control apparatus can be applied to automobiles, construction machines, and the like. The drive-control apparatus may be applicable to any type of electric-drive vehicles which are driven by electric power generated from mechanical power produced by an internal combustion engine.

That is also true of embodiments described below.

Embodiment 2

In Embodiment 2, the pole number of a motor rotating a fan can be changed so that a locomotive does not need to decelerate for cooling while running through a tunnel and such. When the locomotive runs through a tunnel, the temperature of the air in the tunnel rises due to exhaust gas produced by the engine, so that the temperature of the air sent by the fan rises, which lowers its cooling performance. Therefore, a locomotive has conventionally been run at a limited speed while running through a tunnel, in order to control the quantity of the generated heat within a range of its cooling capability.

Figure 2:
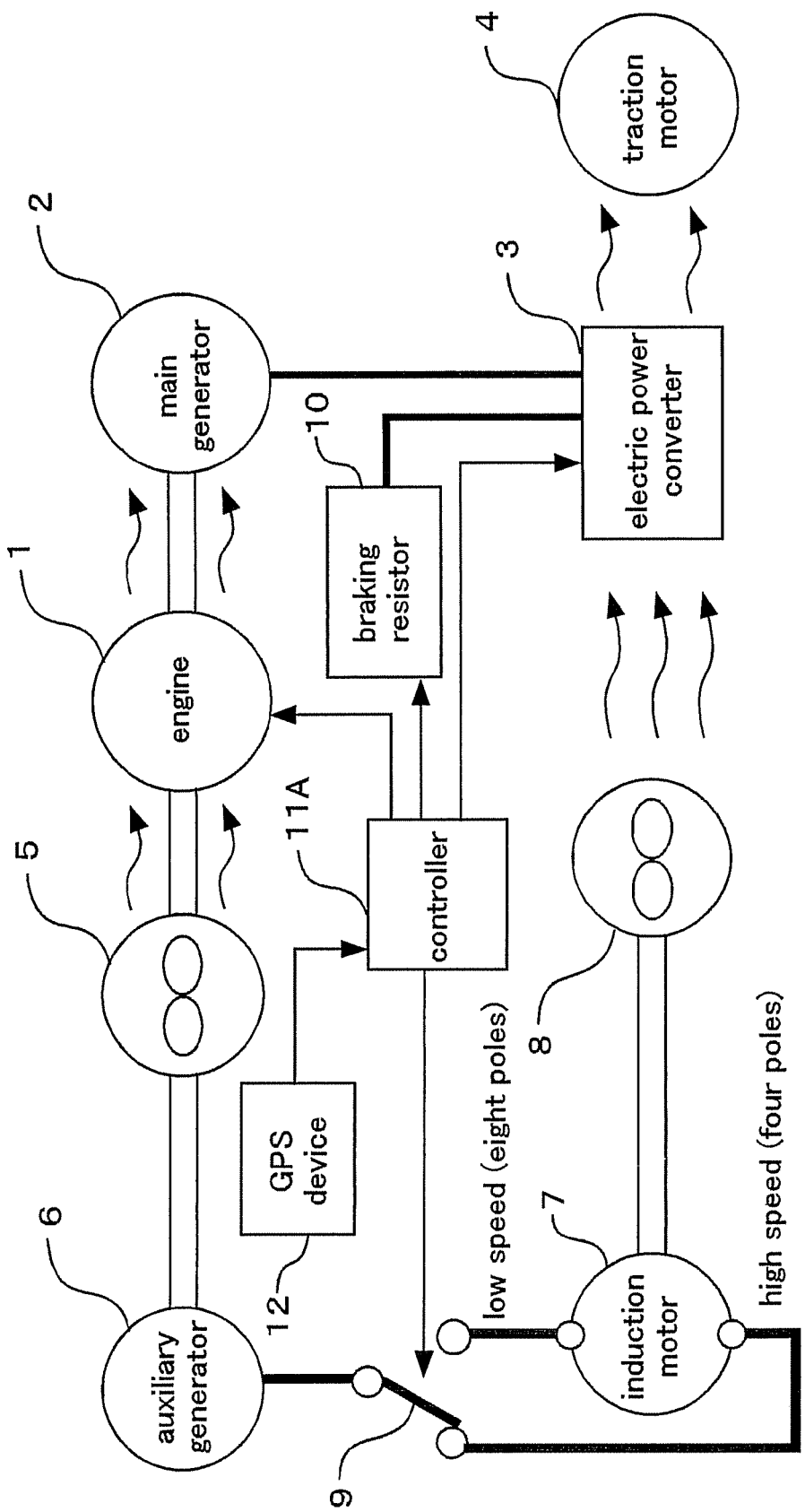
FIG. 2 is a block diagram when a drive-control apparatus, according to Embodiment 2 of the present invention, for the electric-drive vehicle is applied to the diesel-electric locomotive.

FIG. 2 is a block diagram when a drive-control apparatus for an electric-drive vehicle, according to Embodiment 2 of the present invention, is applied to a diesel-electric locomotive. Differences from FIG. 1 of Embodiment 1 will only be explained below. A GPS (Global Positioning System) device 12 is added as a position determination unit that determines the locomotive's location. The signal from the GPS devise 12 is inputted to a controller 11A.

The operations will be explained below. When the location of the locomotive, obtained from the GPS device 12, is in a place in which a normal cooling condition is applied, the engine 1 is controlled to rotate at a predetermined rotation speed f1 so as to produce a necessary torque, so that the main generator 2 and the auxiliary generator 6 generate electricity. The electric power generated by the main generator 2 is converted by the electric power converter 3 into electric power having a predetermined frequency and voltage, from which the traction motor 4 produces a predetermined torque. The pole-number-changing switch 9 is in the low-speed state (eight poles), so that the induction motor 7 and the fan 8 rotate at a rotation speed N1(=f1/4), whereby all of the engine 1, the main generator 2, the electric power converter 3 and the traction motor 4 are efficiently operated, and necessary cooling is performed.

While the locomotive is running through sections, such as tunnels, in which its cooling efficiency is deteriorated, the controller 11A turns the pole-number-changing switch 9 to the high-speed state (four poles). Here, the rotation speed and such of the engine 1 is appropriately controlled, depending on curves and slopes of railway tracks and positional relations with respect to stations where the locomotive stops. That holds true when the locomotive runs through sections other than tunnels.

The rotation speeds of the induction motor 7 and the fan 8 double, that is, to become 2*N1 (=f1/2), which doubles the air flow volume. The cooling efficiency in tunnels seldom becomes lower than 50 percent of its normal efficiency; therefore, its cooling performance is assured in tunnels by doubling the volume of air. This brings effects in that the locomotive does not need to decelerate for cooling in tunnels, and that the locomotive does not waste fuel due to excess cooling while running though sections outside tunnels.

If the pole-number-changing switch 9 is kept at the high-speed state (four poles), an appropriate air flow volume is obtained while running through tunnels. However, while running through sections outside tunnels, the fan generates excessive volume of air flow. It is to be avoided to excessively send air—resulting in wasting fuel.

Instead of the GPS device, the position determination unit may be a device that determines the locomotive's location by communicating information with devices on the ground.

When electric braking is not used, the braking resistor may not be provided.

That is also true of embodiments described below.

Embodiment 3

Figure 3:
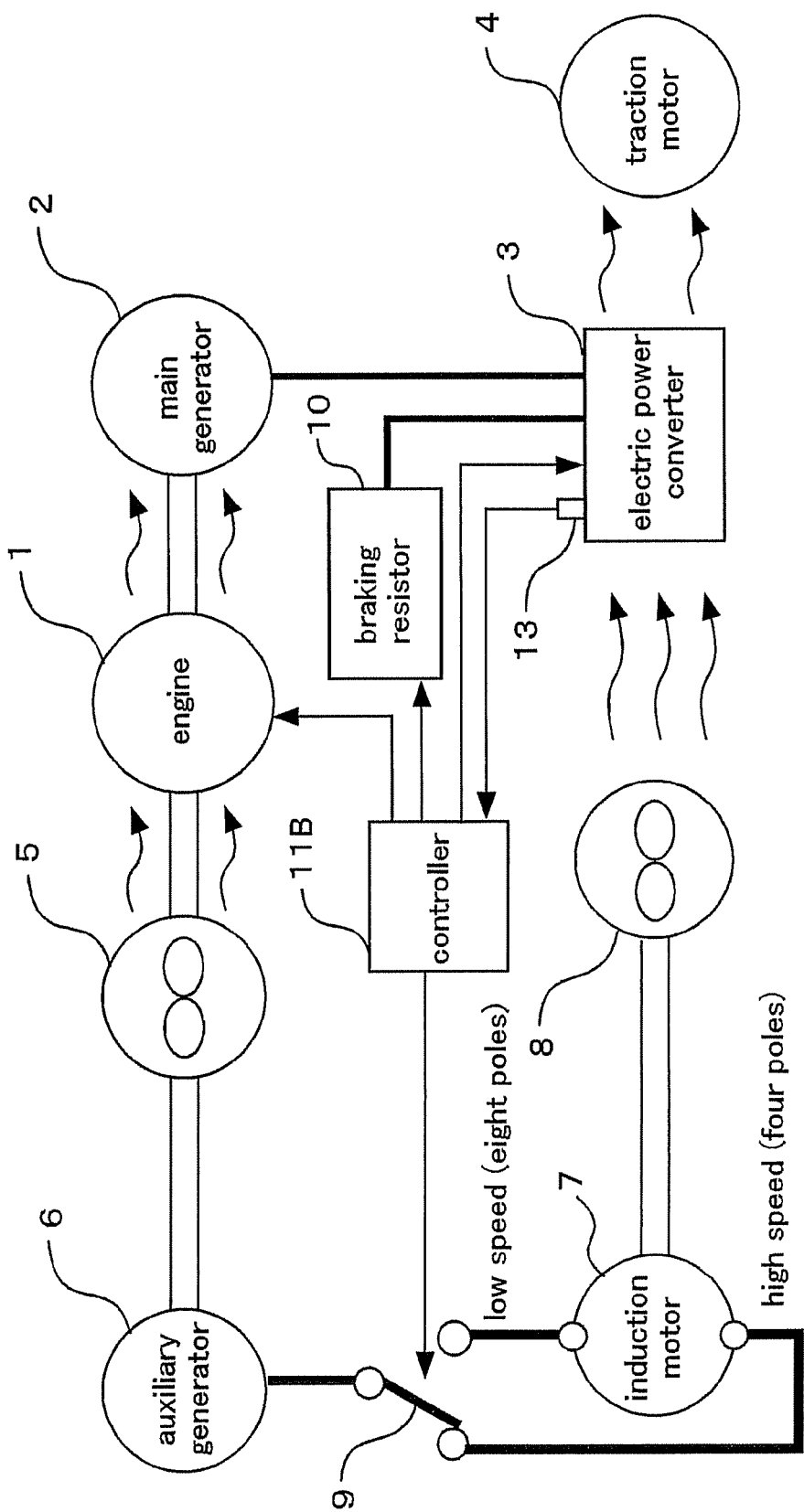
FIG. 3 is a block diagram when a drive-control apparatus, according to Embodiment 3 of the present invention, for the electric-drive vehicle is applied to the diesel-electric locomotive.

In Embodiment 3, a case is described, in which a thermometer to measure the temperature of the electric power converter is provided, and the drive-control apparatus turns the pole-number-changing switch to the high-speed state in order to increase its cooling performance when the temperature of the electric power converter exceeds a predetermined value. p FIG. 3 is a block diagram when a drive-control apparatus for an electric-drive vehicle, according to Embodiment 3 of the present invention, is applied to a diesel-electric locomotive. Differences from FIG. 2 of Embodiment 2 will only be explained below. Instead of the GPS device 12, a thermometer 13 is provided to measure the temperature of the electric power converter 3. The temperature value measured by the thermometer 13 is inputted into a controller 11B.

The operations will be explained below. When the temperature value of the electric power converter 3 measured by the thermometer 13 is a predetermined value or lower, the operations are similar to those of Embodiment 2 while the locomotive is running through sections outside tunnels.

When the temperature value measured by the thermometer 13 exceeds the predetermined value, the controller 11B turns the pole-number-changing switch 9 to the high-speed state (four poles). Thus, the rotation speeds of the induction motor 7 and the fan 8 double, that is, to become 2*N1 (=f1/2), which doubles the air flow volume. Because the air flow volume—its cooling performance—doubles, the electric power converter 3 and the traction motor 4 can be sufficiently cooled down. When the temperature of the electric power converter 3 falls down and the temperature value measured by the thermometer 13 becomes the predetermined value or lower, the controller 11B turns the pole-number-changing switch 9 to the low-speed state (eight poles).

Even when the locomotive runs through sections such as tunnels in which its cooling efficiency is deteriorated, the drive-control apparatus brings effects in that the locomotive does not need to speed down for cooling, and that the locomotive does not waste fuel due to constant excess cooling.

The configurations described in the above embodiments are examples of aspects of the present invention. Combinations of the present invention with heretofore known techniques can be made, and various changes, such as eliminating some of the components, can be made without departing from the scope of the invention.

The invention claimed is:

1. A drive-control apparatus for an electric-drive vehicle, that drives and controls a vehicle driven by electric power generated from mechanical power produced by an internal combustion engine, the apparatus including:

an internal combustion engine for producing mechanical power;

a main generator and an auxiliary generator each for generating electricity, being supplied with the mechanical power that the internal combustion engine generates;

a main rotating machine for producing mechanical power so as to drive the vehicle, being supplied with electric power that the main generator generates, and for generating electric power during deceleration of the vehicle;

an electric power converter for performing conversion of the main-generator-generated electric power to supply the main rotating machine therewith, and for receiving electric power generated by the main rotating machine;

a braking resistor for dissipating electric power that is generated by the main rotating machine and supplied through the electric power converter;

a fan motor supplied with alternating electric power that is generated by the auxiliary generator and has a frequency proportional to a rotation speed of the internal combustion engine, the fan motor whose pole number is changeable;

a fan for making an air flow in order to cool down the electric power converter, being driven by the fan motor;

a pole-number-changing switch for changing the pole number of the fan motor; and a controlling unit for controlling the internal combustion engine, the electric power converter, the braking resistor, and the pole-number-changing switch.

2. A drive-control apparatus for an electric-drive vehicle according to claim 1, wherein the pole-number-changing switch is controlled so as to change the pole number to a smaller number when the main rotating machine is generating electricity.

3. A drive-control apparatus for an electric-drive vehicle, that drives and controls a vehicle driven by electric power generated from mechanical power produced by an internal combustion engine, the apparatus including:

an internal combustion engine for producing mechanical power;

a main generator and an auxiliary generator each for generating electricity, being supplied with the mechanical power that the internal combustion engine generates;

a main rotating machine for producing mechanical power so as to drive the vehicle, being supplied with electric power that the main generator generates;

an electric power converter for performing conversion of the main-generator-generated electric power to supply the main rotating machine therewith;

a fan motor supplied with alternating electric power that is generated by the auxiliary generator and has a frequency proportional to a rotation speed of the internal combustion engine, the fan motor whose pole number is changeable;

a fan for making an air flow in order to cool down the electric power converter, being driven by the fan motor;

a pole-number-changing switch for changing the pole number of the fan motor;

a controlling unit for controlling the internal combustion engine, the electric power converter, and the pole-number-changing switch; and a position determination unit for locating the position of the vehicle and inputting the position into the controlling unit; wherein the pole-number-changing switch is controlled so as to change the pole number to a smaller number when the position obtained by the position determination unit indicates that the vehicle is in a tunnel.

4. A drive-control apparatus for an electric-drive vehicle, that drives and controls a vehicle driven by electric power generated from mechanical power produced by an internal combustion engine, the apparatus including:

an internal combustion engine for producing mechanical power;

a main generator and an auxiliary generator each for generating electricity, being supplied with the mechanical power that the internal combustion engine generates;

a main rotating machine for producing mechanical power so as to drive the vehicle, being supplied with electric power that the main generator generates;

an electric power converter for performing conversion of the main-generator-generated electric power to supply the main rotating machine therewith;

a fan motor supplied with alternating electric power that is generated by the auxiliary generator and has a frequency proportional to a rotation speed of the internal combustion engine, the fan motor whose pole number is changeable;

a fan for making an air flow in order to cool down the electric power converter, being driven by the fan motor;

a pole-number-changing switch for changing the pole number of the fan motor;

a controlling unit for controlling the internal combustion engine, the electric power converter, and the pole-number-changing switch; and a thermometer for measuring a temperature of the electric power converter so as to input the temperature value into the controlling unit, wherein the pole-number-changing switch is controlled so as to change the pole number to a smaller number when the temperature value measured by the thermometer is a predetermined value or higher.

\* \* \* \* \*